(12) United States Patent
Uppunda (10) Patent No.: US 11,188,498 B2
(45) Date of Patent: Nov. 30, 2021

(54) METHOD AND SYSTEM FOR PROCESSING ENGINEERING OBJECTS IN AN INDUSTRIAL AUTOMATION ENVIRONMENT

(71) Applicant: Prashanth Uppunda, Bangalore (IN)

(72) Inventor: Prashanth Uppunda, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 121 days.

(21) Appl. No.: 16/110,744

(22) Filed: Aug. 23, 2018

(65) Prior Publication Data

US 2019/0095449 A1   Mar. 28, 2019

(30) Foreign Application Priority Data

Sep. 27, 2017  (EP) .................................... 17193455

(51) Int. Cl.
*G06F 16/11* (2019.01)
*G06Q 10/06* (2012.01)

(52) U.S. Cl.
CPC .......... *G06F 16/116* (2019.01); *G06Q 10/06* (2013.01)

(58) Field of Classification Search
CPC .... G06F 16/116; G06F 30/13; G06F 2111/20; G06F 30/00; G06Q 10/06
See application file for complete search history.

(56) References Cited

U.S. PATENT DOCUMENTS 6,034,314 A * 3/2000 Koike .................. G10H 1/0075
84/600
6,785,730 B1 * 8/2004 Taylor ..................... H04L 29/06
370/466

(Continued)

FOREIGN PATENT DOCUMENTS

| EP | 2813944 A1 | 12/2014 |
| EP | 2908194 A1 | 8/2015 |
| EP | 2963542 A1 | 1/2016 |

OTHER PUBLICATIONS

Drath, R., Let's talk AutomationML What is the effort of AutomationML programming?, Proceedings of 2012 IEEE 17th International Conference on Emerging Technologies & Factory Automation (ETFA 2012), pp. 1-8. (Year: 2012).*

(Continued)

*Primary Examiner* — Cheyne D Ly
(74) *Attorney, Agent, or Firm* — Lempia Summerfield Katz LLC (57) ABSTRACT

The present disclosure provides a method and system for processing engineering objects in an industrial automation environment. The method includes obtaining a first data file from a user device. The first data file includes one or more engineering objects in a first data format. Further, the method includes identifying a device type associated with the one or more engineering objects in the first data file. The method includes determining one or more transformations associated with the identified device type based on a metadata file stored in a database. Furthermore, the method includes transforming the identified device type to a second data format based on the determined one or more transformations. Additionally, the method includes generating a second data file including the transformed device type in the second data format on a graphical user interface.

17 Claims, 7 Drawing Sheets

(56) References Cited

U.S. PATENT DOCUMENTS

| | | | | |
|---|---|---|---|---|
| 6,965,569 B1* | 11/2005 | Carolan | ............. | H04N 1/00209 |
| | | | | 370/238 |
| 7,062,466 B2* | 6/2006 | Wagner | ................. | G06Q 30/02 |
| | | | | 348/460 |
| 7,124,397 B1* | 10/2006 | Mathur | ................. | G06F 1/3203 |
| | | | | 717/101 |
| 10,157,195 B1* | 12/2018 | Panwar | ................. | G06F 16/254 |
| 2007/0043753 A1 | 2/2007 | Basin et al. | | |
| 2007/0271158 A1* | 11/2007 | Muller | ................. | G06Q 10/06 |
| | | | | 705/28 |
| 2009/0112808 A1* | 4/2009 | Howcroft | ................ | G06F 16/48 |
| 2013/0275383 A1 | 10/2013 | Mclarty | | |
| 2014/0289426 A1* | 9/2014 | Chan | .................... | H04L 67/306 |
| | | | | 709/247 |

OTHER PUBLICATIONS

Vogel-Heuser et al., Model-driven engineering of Manufacturing Automation Software Projects—A SysML-based approach, Mechatronics 24 (2014) 883-897. (Year: 2014).*

European Search Report for corresponding Application No. 17193455.7-1222, dated Jan. 8, 2018.

European Office Action for European Application No. 17193455.7 dated Jun. 9, 2020.

Summons under Rule 115(1) EPC for European Application No. 17193455.7-1222 dated Sep. 20, 2021.

* cited by examiner

METHOD AND SYSTEM FOR PROCESSING ENGINEERING OBJECTS IN AN INDUSTRIAL AUTOMATION ENVIRONMENT

This application claims the benefit of European Patent Application No. EP 17193455.7, titled 'Method and system for processing engineering objects in an industrial automation environment' filed Sep. 27, 2017, which is hereby incorporated by reference in its entirety.

FIELD OF TECHNOLOGY

The present disclosure relates to the field of industrial automation systems, and more particularly relates to a method and system for processing engineering objects in an industrial automation environment.

BACKGROUND

Generally, engineering systems are used for commissioning, project engineering, configuration of controls and drives. In the engineering systems, a control program is developed which is based on an object model. The object model includes technological objects, such as positioner axes, synchronous axes, cam disks, etc., each of which may be connected to other technological objects or to one another in accordance with their functionality. The objects used in the object model may be categorized into different object types such as project, device, program, technological object, and drive object.

Further, the control programs developed in the engineering systems are subsequently loaded into a run-time system responsible for the timed control of the system to be controlled. The run-time systems or the automation engineering systems includes a multiplicity of individual automation objects, which are frequently highly dependent on the engineering system respectively used. Both the objects of the engineering system and of the runtime system are based on the same, executable object model. The use of the same model makes possible a direct interaction at model level (e.g., data exchange and communication) between the engineering objects and runtime objects.

The engineering objects and the runtime objects are exchanged in a specific data format between the run-time systems and the engineering system. This exchange process is supported by import and export operations. The specific data format used for exchanging the engineering objects and the runtime objects are termed as "AutomationML (Automation Markup Language)". The AutomationML is an XML based data format for exchange of plant engineering data. The AutomationML describes real plant components as objects encapsulating different aspects.

During import operation of data exchange, the run-time system modifies the entire object model by converting each of the AutomationML objects to a corresponding automation engineering objects. Similarly, during the export operation, the run-time system further modifies the entire object model by converting run-time objects to corresponding AutomationML objects. These conversions of engineering objects in the object model are common for all device types of a plant. However, in scenarios where a specific device type is not supported by the object model, such conversions of objects associated with the specific device type may not be suitable for the run-time system. For example, A 'S120 Drive' object in run-time system is modeled as one single "Device" and each of its connected periphery, such as a Motor Module, Line Module, Measuring system and other modules, are modeled as sub-devices containing "DeviceItem" modules due to run-time system specific modeling. However, the same principle of modeling may not be suitable for engineering system. For the same object 'S120 Drive', the engineering system models each of the connected periphery as an individual "Device" connected to the main Drive "Device" rather than modeling as a "DeviceItem" as in case of the run-time system. Similarly, other types of devices may adopt a specific way of modeling within the run-time system.

Therefore, this principle of modeling of the objects at the engineering system or at the run-time system requires a special transformation to be adapted specific to the type of devices during import and export mechanism. For such scenarios where various devices are to be dynamically integrated with the run-time system, it becomes extremely difficult for the run-time system to modify the object model each and every time a new device type is to be supported specially by AutomationML import/export mechanism. Further, this process of modifying the object model each and every time for supporting a new device type involves high maintainability of the underlying system and increased efforts and time to update the run-time systems such as an automation engineering application.

SUMMARY AND DESCRIPTION

The scope of the present disclosure is defined solely by the appended claims and is not affected to any degree by the statements within this description. The present embodiments may obviate one or more of the drawbacks or limitations in the related art.

A method and system for processing engineering objects in an industrial automation environment is disclosed. In one aspect, a method for processing engineering objects in an industrial automation environment is disclosed. The method includes obtaining a first data file from a user device. The first data file includes one or more engineering objects in a first data format. Further, the method includes identifying a device type associated with the one or more engineering objects in the first data file. The device type associated with the one or more device instances are in the first data format. Further, the method includes determining one or more transformations associated with the identified device type based on a metadata file stored in a database. The metadata file includes the one or more transformations associated with one or more device types of the one or more device instances. The one or more transformations include adding a specific device type to an object hierarchy, removing a specific device type from the object hierarchy, and the like. Further, the method includes transforming the identified device type to a second data format based on the determined one or more transformations. Additionally, the method includes generating a second data file including the transformed device type in the second data format on a graphical user interface. In an exemplary embodiment, the first data format may correspond to an automation markup language (AutomationML) format and the second data format may correspond to an engineering project data file format. Alternatively, the first data format may correspond to the engineering project data file format and the second data format may correspond to an automation markup language (AutomationML) format. Further, the second data file includes a transformed object hierarchy for the transformed device type in the second data format.

In identifying the device type associated with the one or more engineering objects in the first data file, the method includes generating one or more device instances in the first data format for the one or more engineering objects based on the obtained first data file. Further, the method includes determining a set of properties associated with the generated one or more device instances. The set of properties includes a device type associated with the one or more device instances. Additionally, the method includes generating an object hierarchy of the one or more device instances based on the determined set of properties. The object hierarchy includes the one or more device instances in the first data format and the set of properties associated with the one or more device instances. Furthermore, the method includes identifying the device type associated with the one or more device instances based on the generated object hierarchy.

In determining the one or more transformations associated with the identified device type based on the metadata file stored in the database, the method includes identifying the second data format based on the obtained first data file. Further, the method includes retrieving a metadata file corresponding to the identified second data format from the database. The method further includes determining the one or more transformations associated with the identified device type based on the retrieved metadata file corresponding to the identified second data format.

In an aspect, in determining the one or more from the retrieved metadata file corresponding to the identified second data format, the method includes determining whether the one or more transformations associated with the identified device type are present in the metadata file. If the one or more transformations associated with the identified device type are not present in the metadata file, the method includes generating at least one transformation associated with the identified device type based on a set of rules and storing the generated transformation associated with the identified device type in the database. If the one or more transformations associated with the identified device type are present in the metadata file, the method includes retrieving the one or more transformations associated with the identified device type.

In another aspect, an apparatus for processing engineering objects in an industrial automation environment is disclosed. The apparatus includes a processor and a memory coupled to the processor. The memory includes an object transformation module stored in the form of machine-readable instructions executable by the processor.

The object transformation module is configured for obtaining a first data file from a user device. The first data file includes one or more engineering objects in a first data format. The object transformation module is further configured for identifying a device type associated with the one or more engineering objects in the first data file. The object transformation module is further configured for determining one or more transformations associated with the identified device type based on a metadata file stored in a database. Further, the object transformation module is configured for transforming the identified device type to a second data format based on the determined one or more transformation. Additionally, the object transformation module is configured for generating a second data file including the transformed device type in the second data format on a graphical user interface. The second data file includes a transformed object hierarchy for the transformed device type in the second data format.

In identifying the device type associated with the one or more engineering objects in the first data file, the object transformation module is configured for configured for generating one or more device instances in the first data format for the one or more engineering objects based on the obtained first data file. Furthermore, the object transformation module is configured for determining a set of properties associated with the generated one or more device instances. The set of properties includes a device type associated with the one or more device instances. Additionally, the object transformation module is configured for generating an object hierarchy of the one or more device instances based on the determined set of properties. The object hierarchy includes the one or more device instances in the first data format and the set of properties associated with the one or more device instances. Moreover, the object transformation module is configured for identifying the device type associated with the one or more device instances based on the generated object hierarchy.

In determining the one or more transformations associated with the identified device type based on the metadata file stored in the database the device object transformation module is configured for identifying the second data format based on the obtained first data file. Further, the object transformation module is configured for retrieving a metadata file corresponding to the identified second data format from the database. Additionally, the object transformation module is configured for determining the one or more transformations associated with the identified device type based on the retrieved metadata file corresponding to the identified second data format.

In an aspect, in determining the one or more transformations associated with the identified device type from the retrieved metadata file corresponding to the identified second data format, the object transformation module is configured for determining whether the one or more transformations associated with the identified device type are present in the metadata file. If the one or more transformations associated with the identified device type are not present in the metadata file, the object transformation module is configured for generating at least one transformation associated with the identified device type based on a set of rules and storing the generated transformation associated with the identified device type in the database. If the one or more transformations associated with the identified device type are present in the metadata file, the object transformation module is configured for retrieving the one or more transformations associated with the identified device type.

In yet another aspect, an industrial automation system including the apparatus for performing the method acts described above is disclosed.

In yet another aspect, a non-transitory computer-readable storage medium, having machine-readable instructions stored therein, that when executed by at least one processor, cause the processor to perform the method acts described above.

The above-mentioned and other features of the disclosure will now be addressed with reference to the accompanying drawings of the present disclosure. The illustrated embodiments are intended to illustrate, but not limit the disclosure.

BRIEF DESCRIPTION OF THE DRAWINGS

The present disclosure is further described hereinafter with reference to illustrated embodiments shown in the accompanying drawings, in which.

DETAILED DESCRIPTION

A method and system for processing engineering objects in an industrial automation environment is disclosed. Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Figure 1:
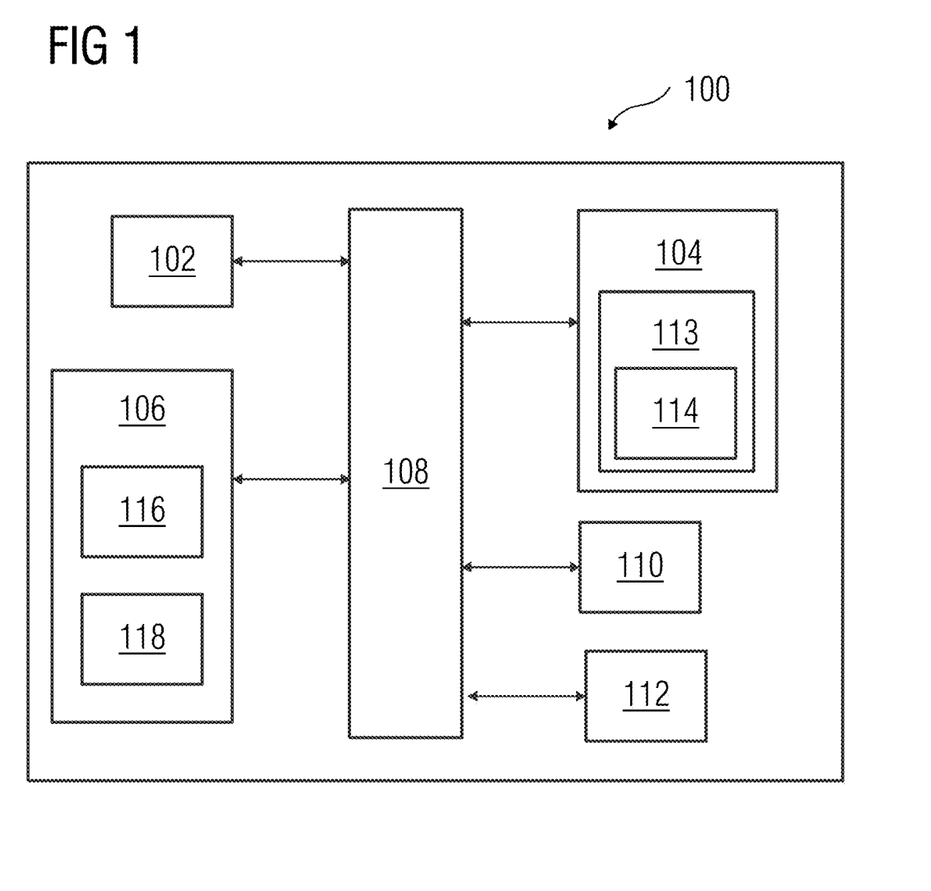
FIG. 1 depicts a block diagram of a data processing system in which an embodiment may be implemented.

FIG. 1 is a block diagram of a data processing system 100 in which an embodiment may be implemented as a data processing system particularly configured by software or otherwise to perform the processes as described herein. The data processing system 100 may be a personal computer, a laptop computer, a tablet, smart phone, or the like. In FIG. 1, the data processing system 100 includes a processing unit 102, an accessible memory 104, a storage unit 106, an input unit 110, an output unit 112, and a bus 108.

The processing unit 102, as used herein, refers to any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processing unit 102 may also include embedded controllers, such as generic or programmable logic devices or arrays, application specific integrated circuits, single-chip computers, and the like.

The memory 104 may be non-transitory volatile memory and non-volatile memory. The memory 104 may be coupled for communication with the processing unit 102, such as being a computer-readable storage medium. The processing unit 102 may execute machine-readable instructions and/or source code stored in the memory 104. A variety of machine-readable instructions may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 104 includes a data handling environment (DHE) 113. The DHE 113 includes an object transformation module 114 stored in the form of machine-readable instructions on any of the above-mentioned storage media and may be in communication with and executed by the processing unit 102.

When executed by the processing unit 102, the object transformation module 114 causes the processing unit 102 to dynamically transform engineering objects in the industrial automation environment using a device type. The object transformation module 114 causes the processing unit 102 to obtain a first data file from a user device. The first data file includes one or more engineering objects in a first data format. Further, the object transformation module 114 causes the processing unit 102 to identify a device type associated with one or more device instances in a first data file; determine one or more transformations associated with the identified device type based on a metadata file stored in a database; and transform the identified device type to a second data format based on the determined one or more transformations. The object transformation module 114 causes the processing unit 102 to generate a second data file including the transformed device type in the second data format on a graphical user interface of the data processing system 100, such as the output unit 112. The transformed device type is associated with one or more device instances of the one or more engineering objects. Method acts performed by the processing unit 102 to achieve the above functionality are described in greater detail in FIG. 5.

The storage unit 106 may be a non-transitory storage medium which stores a first data file database 116 and a second data file database 118. The first data file may correspond to, for example, AutomationML files. The second data file may correspond to, for example, engineering project files. Each engineering project file contains information on design of electrical component configurations, symbol definitions, network connection information, and the like.

The input unit 110 may include input devices such as a keypad, touch-sensitive display, camera (such as a camera receiving gesture-based inputs), etc., capable of receiving one or more input signals, such as user commands to process engineering objects in the DHE 113. The output unit 112 may be a display unit for displaying a graphical user interface which visualizes the representation of the transformed device type in the second data format and the output of the transformed device type in the second data file. The bus 108 acts as interconnect between the processing unit 102, the memory 104, the storage unit 106, the input unit 110, and the output unit 112.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, and input/output (I/O) adapter also may be used in addition or in place of the hardware depicted. The depicted example is provided for the purpose of explanation only and is not meant to imply architectural limitations with respect to the present disclosure.

Disclosed embodiments provide methods and systems that process engineering objects in an industrial automation environment. In particular, disclosed techniques may obtain a first data file from a user device, where the first data file includes one or more engineering objects in a first data format; identify a device type associated with the one or more engineering objects in the first data file; determine one or more transformations associated with the identified device type based on a metadata file stored in a database; transform the identified device type to a second data format based on the determined one or more transformations; and generate a second data file including the transformed device type in the second data format on a graphical user interface of the data processing system, such as data processing system 100.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 100 may conform to any of the various current implementation and practices known in the art.

Figure 2:
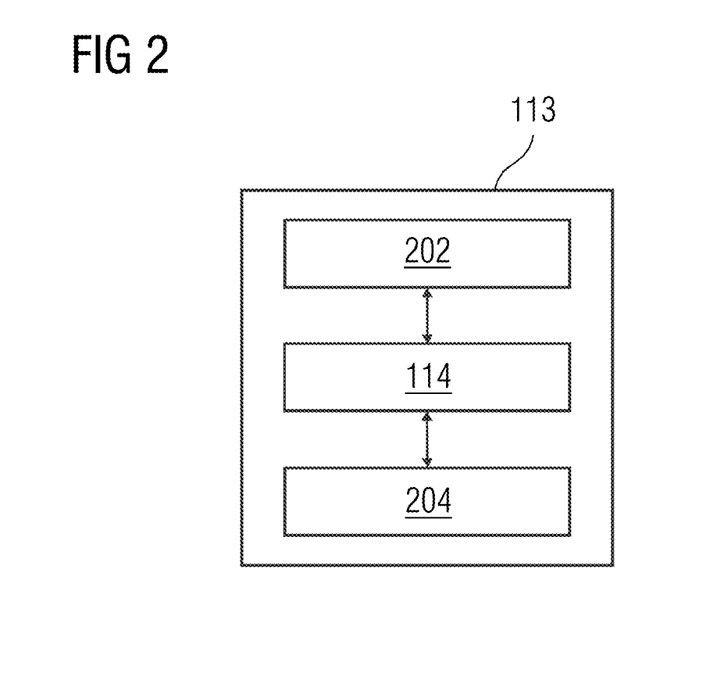
FIG. 2 depicts a detailed view of a data handling environment, such as those shown in FIG. 1, according to an embodiment.

FIG. 2 is a detailed view of data handling environment 113, such as those shown in FIG. 1, according to an embodiment of the present disclosure. In FIG. 2, the data handling environment (DHE) 113 includes a data parsing/generating module 202, the object transformation module 114, and a sub-system logic unit 204. In an embodiment, the data parsing/generating module 202 in communication with the object transformation module 114 is configured for obtaining a first data file from a user device. In an embodiment, the first data file may also be obtained from a database (such as the first data file database 116 and the second data file database 118 of the data processing system 100) or an external database. The first data file includes the one or more engineering objects in the first data format. Further, the data parsing/generating module 202 in communication with the object transformation module 114 is configured for generating one or more device instances in the first data format for the one or more engineering objects based on the obtained first data file. Furthermore, the data parsing/generating module 202 in communication with the object transformation module 114 is configured for determining a set of properties associated with the generated one or more device instances. The set of properties includes a device type associated with the one or more device instances. Further, the set of properties includes device configuration information, device connectivity information, device location, and/or device status information. Additionally, the data parsing/generating module 202 in communication with the object transformation module 114 is configured for generating an object hierarchy of the one or more device instances based on the determined set of properties. The object hierarchy includes the one or more device instances in the first data format and the set of properties associated with the one or more device instances.

The object transformation module 114 is configured for performing device type specific model transformations of the one or more device instances. The object transformation module 114 allows specific device implementation providers a facility to dynamically hook-in and transform an object model maintained by the object transformation module 114 as required. Further, the thus transformed model is then used to create corresponding automation engineering project accordingly during an import operation, for example. Alternatively, during an export operation, the transformed model is fed as an input to the data parsing/generating module 202. This technique is explained in detail further. In an exemplary embodiment, the object transformation module 114 includes an in-memory data structure depicting an automation engineering object hierarchy as expected in an Automation ML file. The object hierarchy may include, for example, engineering objects, such as 'Project' object which in turn may contain zero or more 'Device' objects and zero or more 'Subnet' objects. Similarly, a 'Device' object may in turn include zero or more 'DeviceItem' object (for example, a Rack or I/O module or such object).

The object transformation module 114 is configured for obtaining a first data file from a user device. The first data file includes one or more engineering objects in a first data format. Further, the object transformation module 114 is configured for identifying a device type associated with the one or more engineering objects in the first data file. The device type associated with the one or more engineering objects are in a first data format. Further, the object transformation module 114 is configured for determining one or more transformations associated with the identified device type based on a metadata file stored in a database (such as those shown in FIG. 3). The metadata file includes the one or more transformations associated with one or more device types of the one or more device instances. The one or more transformations includes adding a specific device type to the object hierarchy, removing a specific device type from the object hierarchy, combining multiple devices into one single device, splitting one device into several devices, inserting specific properties and/or modifying specific properties for a specific device type and the like. Furthermore, the object transformation module 114 is configured for transforming the identified device type to a second data format based on the determined one or more transformations. Additionally, the object transformation module 114 is configured for generating a second data file including the transformed device type in the second data format on a graphical user interface, such as the output unit 112. The transformed device type is associated with the one or more device instances of the one or more engineering objects. Further, in determining the one or more transformations associated with the identified device type based on the metadata file stored in the database, the object transformation module 114 is configured for identifying the second data format based on the obtained first data file, retrieving a metadata file corresponding to the identified second data format from the database, and determining the one or more transformations associated with the identified device type based on the retrieved metadata file corresponding to the identified second data format. Further, in determining the one or more transformations associated with the identified device type based on the retrieved metadata file corresponding to the identified second data format, the object transformation module 114 is configured for determining whether the one or more transformations associated with the identified device type are present in the metadata file. If the one or more transformations associated with the identified device type are not present in the metadata file, the object transformation module 114 is configured for generating at least one transformation associated with the identified device type based on a set of rules and storing the generated transformation associated with the identified device type in the database. If the one or more transformations associated with the identified device type are present in the metadata file, the object transformation module 114 is configured for retrieving the one or more transformations associated with the identified device type.

The sub-system logic unit 204 is configured for generating a second data file including the transformed device type in the second data format. The second data file includes a transformed object hierarchy for the transformed device type in the second data format.

Those of ordinary skilled in the art will appreciate that the data handling environment 113 depicted in FIG. 2 may vary for particular implementations. For example, the DHE 113 may include further modules not shown in FIG. 2 to implement the embodiments disclosed herein. Alternatively, the DHE 113 may also include the object transformation module 114, where the object transformation module 114 may itself include the data parsing/generating module 202 and the sub-system logic unit 204 to perform the method acts as described herein.

In an exemplary embodiment, during a process of import of first data file, such as an AutomationML file into the data processing system 100, such as an automation engineering system, the data parsing/generating module 202 parses the first data file in the first data format, such as the AutomationML file in the XML based format using standard XML parsing techniques and performs one or more validations on the input data file as defined. The first data file may include one or more engineering objects. The one or more validations may include any such validations known to a person ordinary skilled in the art. Further, the data parsing/generating module 202 generates one or more device instances of the engineering objects and determines the set of properties associated with the generated one or more device instances. The set of properties may include a device type associated with the one or more device instances. The data parsing/generating module 202 then generates a complete object hierarchy as defined by the object transformation module 114 using the parsed data from the first data file, such as the Automation ML file. The generated object hierarchy is used by the object transformation module 114 for determining transformations associated with each device type of the one or more device instances and transforming the device types appropriately based on the determined transformation. The sub-system logic unit 204 then uses engineering application interfaces in the data processing system 100 to generate a second data file, such as engineering project data based on the transformed device types.

In another exemplary embodiment, during a process of export of input data file, such as the AutomationML from the data processing system 100, such as the automation engineering system, the sub-system logic unit 204 uses the engineering application interfaces to extract engineering objects from the first data file, such as for example, an engineering project using standard extraction techniques known in the art. Further, the sub-system logic unit 204 generates one or more device instances of the engineering objects and determines the set of properties associated with the generated one or more device instances. The set of properties may include a device type associated with the one or more device instances. The sub-system logic unit 204 then generates a complete object hierarchy as defined by the object transformation module 114 using the extracted engineering objects from the first data file, such as the engineering project file. The generated object hierarchy is used by the object transformation module 114 for determining transformations associated with each device type of the one or more device instances and transforming the device types appropriately based on the determined transformation. The data parsing/generating module 202 then parses the transformed device type to generate a second data file, such as an AutomationML file based on the transformed device types.

Figure 3:
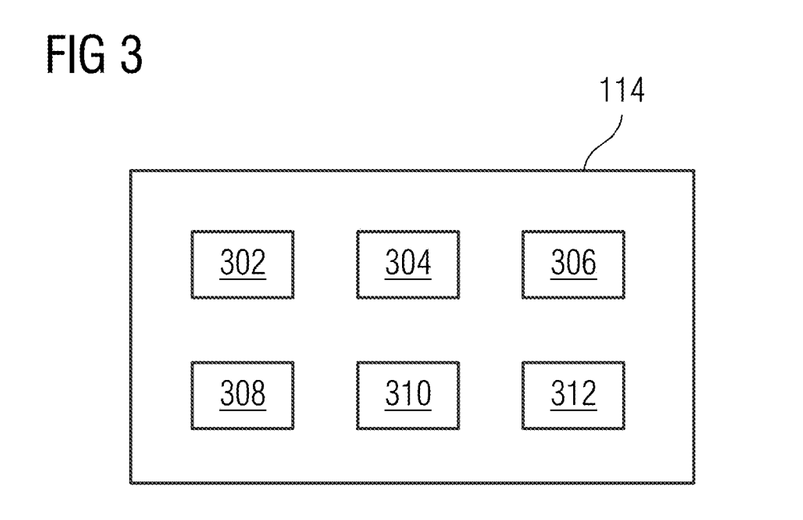
FIG. 3 depicts a block diagram illustrating various modules of an object transformation module of FIG. 1, according to an embodiment.

FIG. 3 is a detailed view of the object transformation module 114, such as those in FIG. 1, according to an embodiment of the present disclosure. The object transformation module 114 includes a device instance generator module 302, an object hierarchy generator module 304, a device type identifier module 306, an object transformer module 308, an object database 310 and an output module 312.

The device instance generator module 302 is configured for obtaining a first data file from a user device in an embodiment. In another embodiment, the first data file may be obtained from a database, such as first data file database 116 or any external database. The first data file includes the one or more engineering objects in the first data format. The device instance generator module 302 is further configured for generating the one or more device instances in the first data format for the one or more engineering objects based on the obtained first data file.

The object hierarchy generator module 304 is configured for determining the set of properties associated with the generated one or more device instances. The set of properties includes a device type associated with the one or more device instances. The set of properties also includes device configuration information, device connectivity information, device location, and/or device status information, and the like. The object hierarchy generator module 304 is further configured for generating an object hierarchy of the one or more device instances based on the determined set of properties. The object hierarchy includes the one or more device instances in the first data format and the set of properties associated with the one or more device instances.

The device type identifier module 306 is configured for identifying a device type associated with the one or more device instances based on the generated object hierarchy. In specific, the device type identifier module 306 is configured for identifying a device type associated with the one or more device instances based on the set of properties associated with the one or more device instances included in the generated object hierarchy. The device types are in the first data format.

The object transformer module 308 is configured for determining one or more transformations associated with the identified device type based on a metadata file stored in the object database 310. The one or more transformations includes adding a specific device type to the object hierarchy, removing a specific device type from the object hierarchy, combining multiple devices into one single device, splitting one device into several devices, inserting specific properties and/or modifying specific properties for a specific device type, and the like. The metadata file includes the one or more transformations associated with one or more device types of the one or more device instances. Further, the object transformer module 308, in determining the one or more transformations associated with the identified device type based on the metadata file stored in the object database 310, is also configured for identifying the desired second data format based on the obtained first data file. Further, the object transformer module 308 is configured for retrieving the metadata file corresponding to the identified second data format from the object database 310. Additionally, the object transformer module 308 is configured for determining the one or more transformations associated with the identified device type based on the retrieved metadata file corresponding to the identified second data format. Additionally, in determining the one or more from the retrieved metadata file corresponding to the identified second data format, the object transformer module 308 is configured for determining whether the one or more transformations associated with the identified device type are present in the metadata file. If the one or more transformations associated with the identified device type are not present in the metadata file, the object transformer module 308 is configured for generating at least one transformation associated with the identified device type based on a set of rules; and storing the generated transformation associated with the identified device type in the database. The set of rules may define set of conditions or criteria for generating at least one transformation associated with the identified device type. For example, the set of conditions may include checking a set of properties associated with each device item under the one or more device instances and determining whether the set of properties associated with each device item maps to a predefined value. For example, if the set of properties associated with the device item map to at least one predefined value, then the at least one transformation associated with the identified device type is generated. This at least one transformation may be, for example, to delete the respective device item if the set of properties associated with the device item maps to the at least one predefined value. Similarly, if the set of properties of the device item does not map with the at least one predefined value, a new value for the device item may be generated and hence a new rule may be defined.

In another embodiment, if the one or more transformations associated with the identified device type are present in the metadata file, the object transformer module 308 is configured for retrieving the one or more transformations associated with the identified device type.

Furthermore, the object transformer module 308 is configured for transforming the identified device type to a second data format based on the determined one or more transformations.

The object database 310 stores the generated object hierarchy prior to the process of transformation. The object database 310 also stores the device types associated with the device instances, a metadata file including the one or more transformations associated with one or more device types specific to each user device (such as the data processing system 100), transformed device types, the set of rules, object hierarchy including the transformed device objects and the generated second data file in the second data format.

The output module 312 is configured for generating a second data file including the transformed device type in the second data format on a graphical user interface, such as the output unit 112. The transformed device type is associated with the one or more device instances of the engineering objects. The second data file includes a transformed object hierarchy for the transformed device type.

Figure 4:
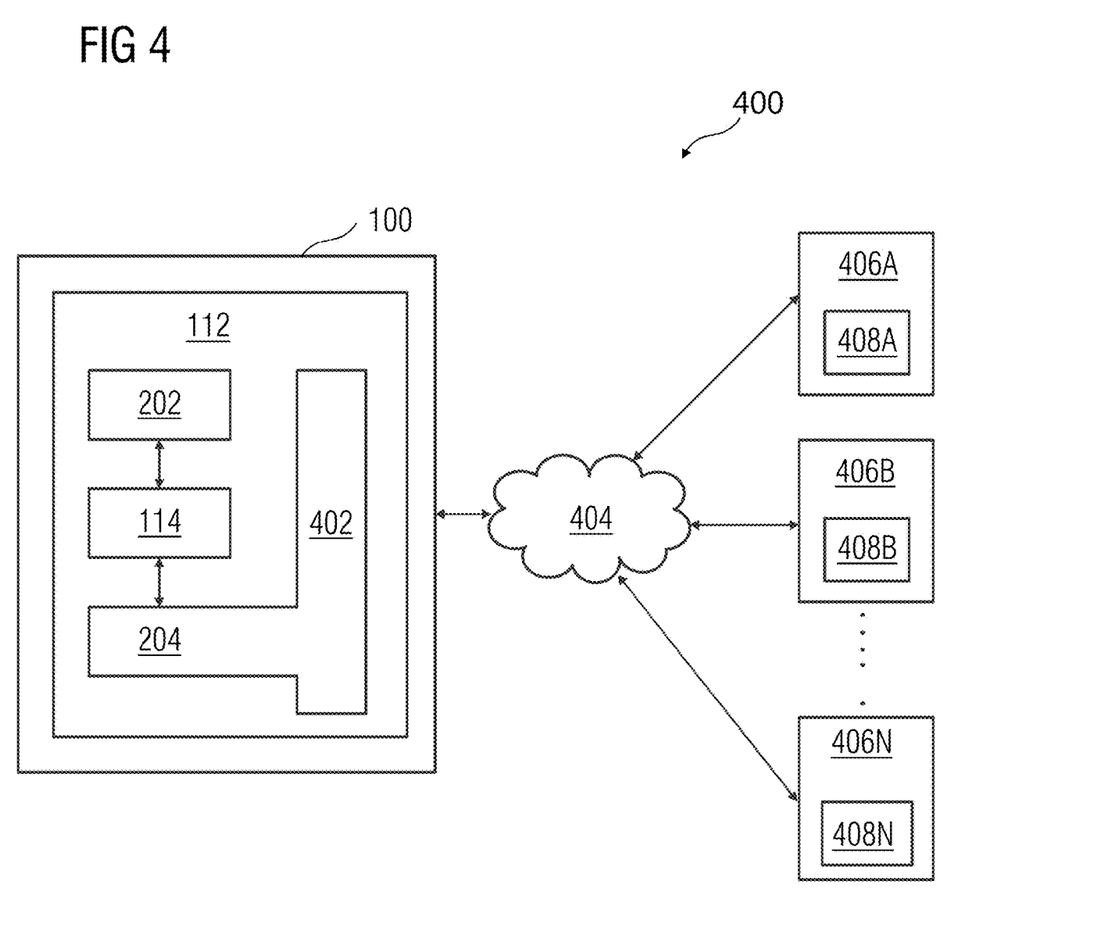
FIG. 4 depicts a block diagram of an industrial automation system, according to an embodiment.

FIG. 4 is a block diagram of an industrial automation system 400, according to an embodiment of the present disclosure. In FIG. 4, the industrial automation system 400 includes a data processing system 100, such as those shown in FIG. 1, a plurality of target devices 406A-N. The data processing system 100 communicates with the plurality of target devices 406A-N via a communication network 404 (e.g., Local Area Network (LAN), Wide Area Network (WAN), Wi-Fi, etc.). The data processing system 100 is such as those shown in FIG. 1, wherein the object transformation module 114 resides in the data processing system 100 and is accessed by target devices 406A-N via the network 404.

The data processing system 100 includes the data handling environment (DHE) 113. The DHE environment 113 includes the data parsing/generating module 202, the object transformation module 114 and the sub-system logic unit 204 such as those shown in FIG. 2. The data processing system 100 may also include an object transformation plug-in infrastructure 402 as extended to the sub-system logic unit 204 or alternatively to the object transformation module 114. In other words, the sub-system logic unit 204 acts as a plug-in host hosting various target device specific transformers, further described herein. The object transformation plug-in infrastructure 402 facilitate the plurality of target devices 406A-N to plug-in to the data handling environment (IDE) 113 and transform the object model based on the respective target device 406A-N requirement. In an embodiment, the object transformation module 114 is exposed via an interface, for access from outside the data handling environment 113. Further, the data processing system 100 may also include a processing unit, a memory, and a storage unit. The DHE 113 may be stored on the memory in the form of machine-readable instructions and executable by the processing unit. The data processing system 100 may also include a communication interface for enabling communication with target devices 406A-N via the network 404.

The target devices 406A-N include target device specific model transformer 408A-N implementing a standard transformation interface defined by the object transformation module 114 as in the IDE 113 and performing a transformation to the object model with respect to specific types of devices during the data exchange process. The target device specific model transformer 408A-N includes a transformation metadata file including information on various device/components of a plant/system. This transformation metadata file is then used by the DHE 113 for identifying various device objects (also referred as engineering objects), which are specific to the target devices 406A-N. The transformation metadata file is same as the metadata file described above in the embodiments. This metadata file also includes information on specific device types to be transformed by each target device specific model transformer 408A-N in communication with the DHE 113.

In an exemplary embodiment, during a process of import of first data file, such as, AutomationML, into the data processing system 100, such as an automation engineering system, the data parsing/generating module 202 parses the first data file using standard XML parsing techniques and performs necessary validations. The first data file includes one or more engineering objects, such as, but not limited to projects, device objects, and the like. Further, the data parsing/generating module 202 in communication with the object transformation module 114 generates one or more device instances of the engineering objects and determines the set of properties associated with the generated one or more device instances. The set of properties may include a device type associated with the one or more device instances. The data parsing/generating module 202 in communication with the object transformation module 114 then generates a complete object hierarchy as defined by the object transformation module 114 using the parsed data from the first data file, such as the Automation ML file.

In an embodiment, the object transformation plug-in infrastructure 402, for each target device specific model transformer 408A-N, determines the available transformations associated with specific device types present in the generated object hierarchy. Further, the object transformation plug-in infrastructure 402 stores this determined transformations associated with the specific device type which are specific to each target device specific model transformer 408A-N as a metadata file in the object database 310.

Whenever the sub-system logic unit 204 identifies this specific device types for a particular target device specific model transformer 408A-N in the generated object hierarchy, the sub-system logic unit 204 in communication with the object transformation module 114 determines specific transformations associated with the specific device type that are applicable for such target device specific model transformer 408A-N based on the stored metadata file. Further, the sub-system logic unit 204 in communication with the object transformation module 114 transforms the specific device type as determined and outputs the transformed device type in a second data format, such as, an engineering project using engineering application interfaces. This transformed device type is generated as a second data file, such as, for example, an engineering project data file. Thus, for specific device types, the transformation is achieved by manipulating specific engineering objects on the object model and not changing the entire underlying implementation in automation engineering applications. Further, the embodiments herein also allow the target devices (e.g., implementing specific device type supports) to manipulate the object hierarchy generated at the data processing system 100, such as for example, an automation engineering system for efficient data exchange between an data processing system 100 (e.g., for an automation engineering system) and the target device application (e.g., for an electrical engineering application).

Similarly, in another exemplary embodiment, during a process of export of first data file, (such as an engineering project data file), into the data processing system 100, (such as an automation engineering system), the sub-system logic unit 204 in communication with the object transformation module 114 uses the engineering application interfaces for extracting/retrieving the engineering objects from the first data file. Further, the sub-system logic unit 204 in communication with the object transformation module 114 generates one or more device instances of the engineering objects and determines the set of properties associated with the generated one or more device instances. The set of properties may include a device type associated with the one or more device instances. The sub-system logic unit 204 in communication with the object transformation module 114 then generates a complete object hierarchy as defined by the object transformation module 114 using the extracted engineering objects from the first data file, such as the engineering project file.

In an embodiment, the object transformation plug-in infrastructure 402, for each target device specific model transformer 408A-N, determines the available transformations associated with specific device types present in the generated object hierarchy. Further, the object transformation plug-in infrastructure 402 stores this determined transformations associated with the specific device type which are specific to each target device specific model transformer 408A-N as a metadata file in the object database 310. Whenever the sub-system logic unit 204 in communication with the object transformation module 114 identifies this specific device types for a particular target device specific model transformer 408A-N in the generated object hierarchy, the sub-system logic unit 204 in communication with the object transformation module 114 determines specific transformations associated with the specific device type that are applicable for such target device specific model transformer 408A-N based on the stored metadata file. Further, the sub-system logic unit 204 in communication with the object transformation module 114 transforms the specific device type as determined. The data parsing/generating module 202 in communication with the object transformation module 114 then outputs the transformed device type in a second data format, such as, the AutomationML file format using the transformed device type. This transformed device type is generated in a second data file, such as for example, AutomationML data file.

Embodiments described herein enable transformation of object model based on desired needs of target devices, such as 406A-N, without modification to central components of data handling environment 113. This enables high maintainability of the data processing system 100, such as for example, an automation engineering and allows data exchange with target devices (such as target devices 406A-N), for example, electrical engineering, to be more accurate and efficient thereby saving costs and efforts. Further, the embodiments disclosed herein facilitate device type specific transformations. The method and system disclosed herein also provides flexibility to transform (such as add or remove) certain types of devices from the object model in specific scenarios (e.g., in case of no specific license available for supporting a special device, a specific transformation plug-in may remove those type of devices from the model). Embodiments disclosed herein also allow third party devices, such as target devices 406A-N to be integrated with special device type and specific handling for data exchange between the data processing system 100, (for example, an automation engineering), and the target device application (for example, an electrical engineering application).

Figure 5:
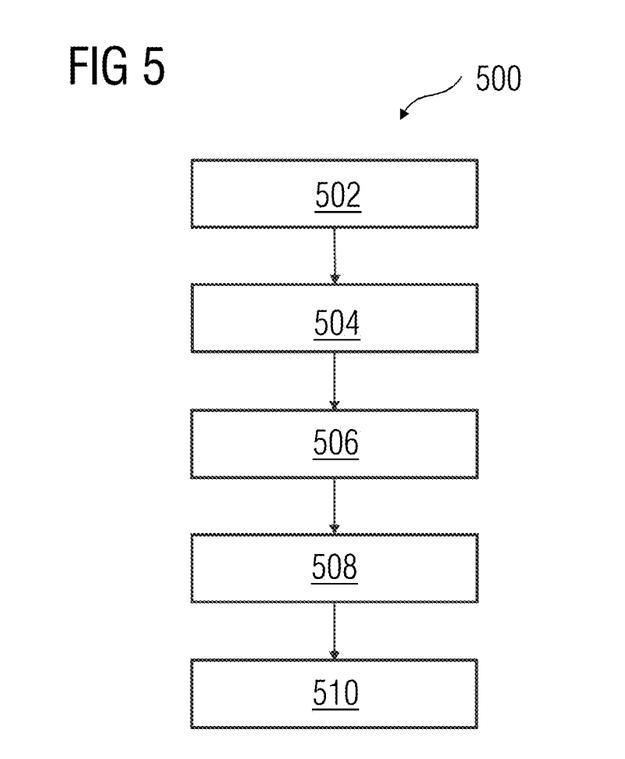
FIG. 5 depicts a process flowchart illustrating an exemplary method of processing engineering objects in an industrial automation environment, according to an embodiment.

FIG. 5 is a process flowchart 500 illustrating an exemplary method of dynamically transforming engineering objects in an industrial automation environment, according to an embodiment of the present disclosure. At act 502, a first data file is obtained from a user device. The first data file includes one or more engineering objects in a first data format. At act 504, a device type associated with the one or more engineering objects is identified in the first data file. The device type is in a first data format. At act 506, one or more transformations associated with the identified device type are determined based on a metadata file stored in a database. The one or more transformations includes adding a specific device type to the object hierarchy, removing a specific device type from the object hierarchy, combining multiple devices into one single device, splitting one device into several devices, inserting specific properties and/or modifying specific properties for a specific device type, and the like. The metadata file includes the one or more transformations associated with one or more device types of the one or more device instances. In an embodiment, the determination of one or more transformations associated with the identified device type may include identifying the second data format based on the obtained first data file, retrieving a metadata file corresponding to the identified second data format from the database; and determining the one or more transformations associated with the identified device type based on the retrieved metadata file corresponding to the identified second data format.

In an embodiment, the determination of the one or more transformations associated with the identified device type based on the retrieved metadata file corresponding to the identified second data format may include determining whether the one or more transformations associated with the identified device type are present in the metadata file. If the one or more transformations associated with the identified device type are not present in the metadata file, at least one transformation associated with the identified device type is generated based on a set of rules and is stored in the database. The set of rules may be predefined by the object transformation module 114 or may be defined at the instant by a user. The set of rules may include device specific rules such as device type based rule, device connectivity based rule, main device based rule, component or device item based rule, and application file based rule, and the like. If the one or more transformations associated with the identified device type are present in the metadata file, the one or more transformations associated with the identified device type is retrieved from the database.

At act 508, the identified device type is transformed into a second data format based on the determined one or more transformations. At act 510, a second data file including the transformed device type in the second data format is generated on a graphical user interface, such as the data processing system 100. The transformed device type is associated with the one or more device instances of the one or more engineering objects. The second data file includes a transformed object hierarchy for the transformed device type.

Figure 6:
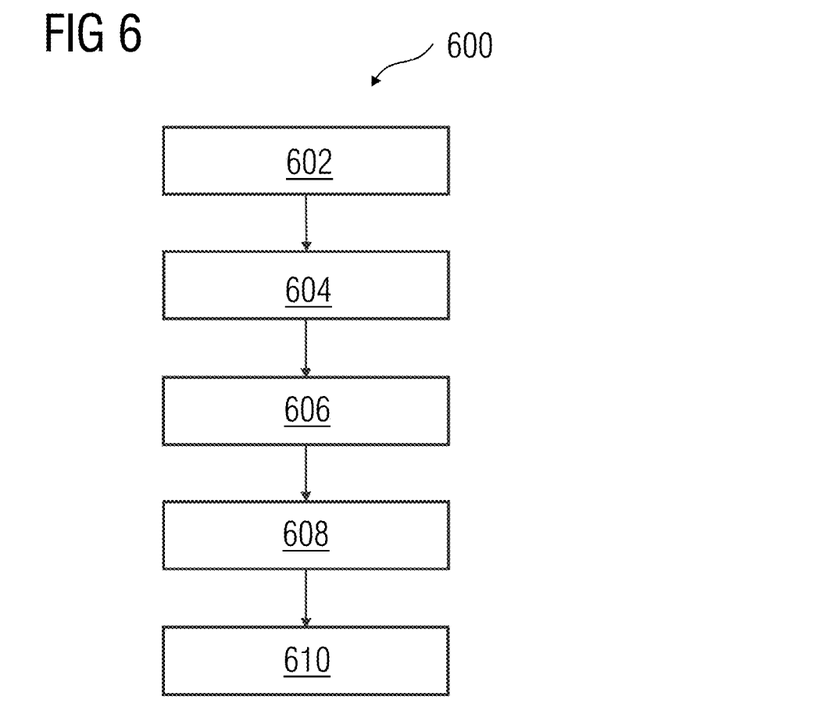
FIG. 6 depicts a process flowchart illustrating an exemplary method of identifying device type associated with the engineering objects in the first data file, according to an embodiment.

FIG. 6 is a process flowchart 600 illustrating an exemplary method of identifying device type associated with the one or more engineering objects in the first data file, according to an embodiment of the present disclosure. At act 602, a first data file is obtained from a user device. The first data file includes one or more engineering objects in a first data format. Alternatively, the first data file is obtained from a database, such as the file data file database 116 or any external database. At act 604, one or more device instances in the first data format for the one or more engineering objects are generated based on the obtained first data file. At act 606, the set of properties associated with the generated one or more device instances are determined. The set of properties includes a device type associated with the one or more device instances. The set of properties may also include device configuration information, device connectivity information, device location, and/or device status information. At act 608, an object hierarchy of the one or more device instances is generated based on the determined set of properties. The object hierarchy includes the one or more device instances in the first data format and the set of properties associated with the one or more device instances. At act 610, the device type associated with the one or more device instances is identified based on the generated object hierarchy. In specific, the device type associated with the one or more device instances in the first data file is identified based on the set of properties associated with the one or more device instances.

Figure 7A:
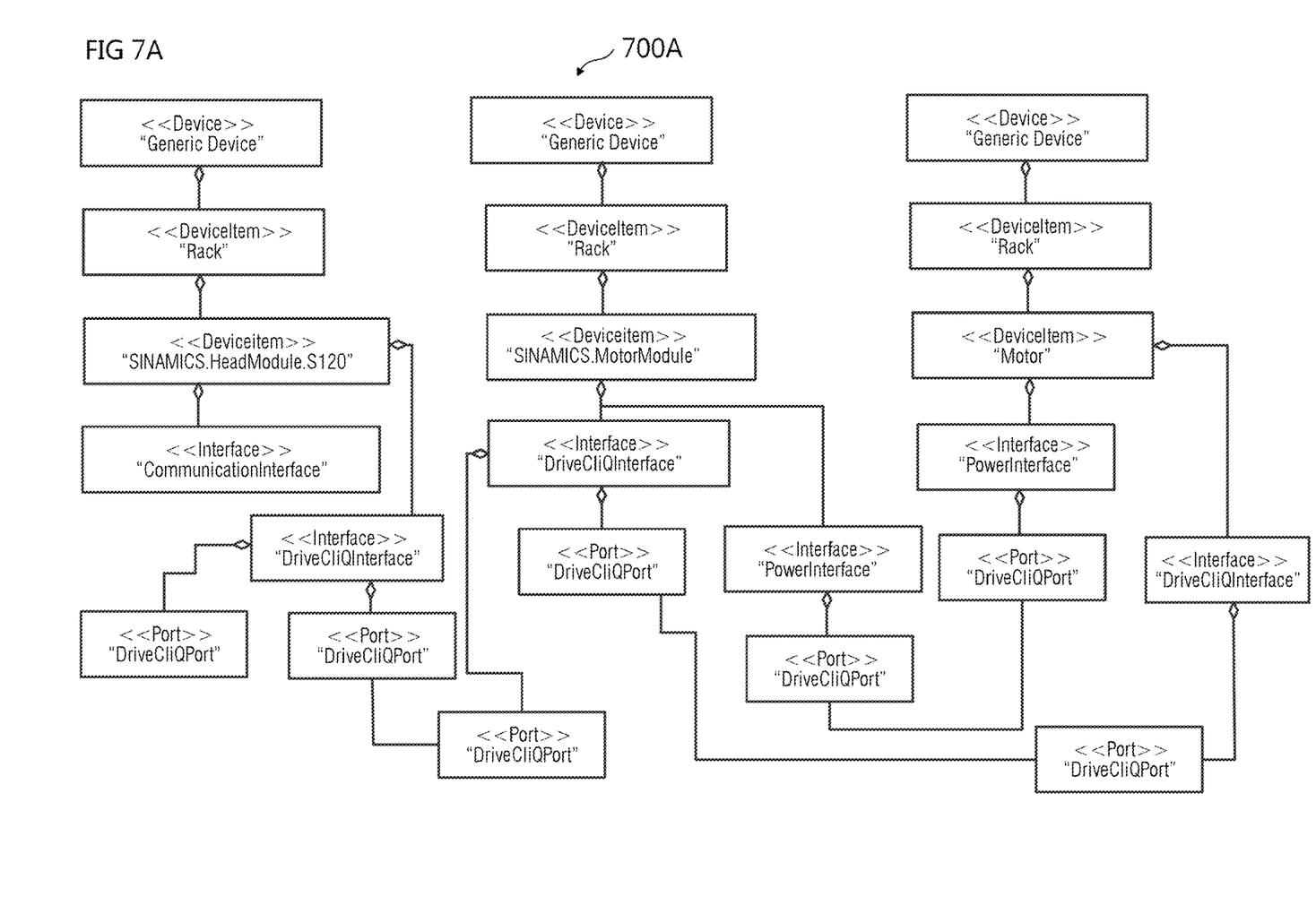
FIG. 7A-B depict a schematic representation of an exemplary device instance model in an industrial automation system, according to an embodiment.
Figure 7B:
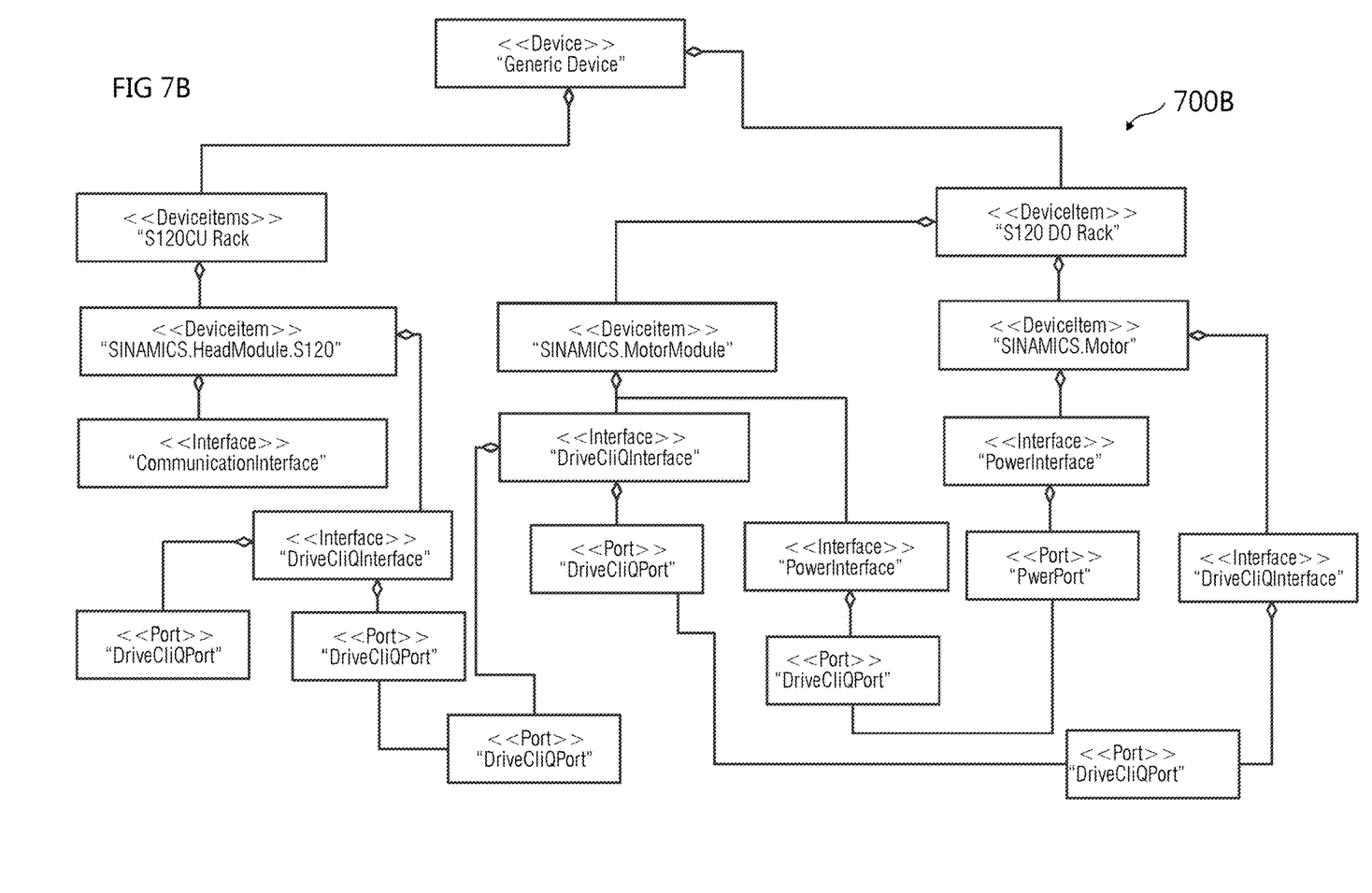

FIG. 7A-B is a snapshot of an exemplary device instance model in an industrial automation system, according to an embodiment of the present disclosure. In FIG. 7A, an exemplary device instance model is represented in first data format, for example, AutomationML format. The device instance model or the object model defines a state of the object transformation module 114 after parsing the first data file. In FIG. 7A, the object hierarchy of various engineering objects such as device, DeviceItem, interface is depicted for each devices in the first data file. FIG. 7B depicts the transformed device instance model or the object model after performing specific transformations to specific device types. As seen from FIG. 7B, some of the individual device instances are removed and only one S120 device instance is retained in the object model/device instance model. Also, a transformation is performed with respect to object 'Racks'.

The present disclosure may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for processing engineering objects in an industrial automation environment, the method comprising:
obtaining, by a processor, a first data file from a user device, wherein the first data file comprises one or more engineering objects in a first data format;
identifying a device type associated with the one or more engineering objects in the first data file;
identifying a second data format based on the obtained first data file;
determining one or more transformations associated with the identified device type associated with the one or more engineering objects based on a metadata file stored in a database, wherein the metadata file corresponds to the identified second data format, wherein the metadata file comprises the one or more transformations associated with one or more device types of one or more device instances, and wherein the determining of the one or more transformations comprises determining whether the one or more transformations associated with the identified device type are present in the metadata file and generating at least one transformation associated with the identified device type based on a set of rules when no transformations associated with the identified device type are determined present in the metadata file;

transforming the identified device type associated with the one or more engineering objects to the second data format based on the determined one or more transformations; and generating a second data file comprising the transformed device type, associated with the one or more engineering objects, in the second data format on a graphical user interface.

2. The method of claim 1, wherein the second data file comprises a transformed object hierarchy for the transformed device type in the second data format.

3. The method of claim 1, wherein the identifying of the device type comprises:

generating the one or more device instances in the first data format for the one or more engineering objects based on the obtained first data file;

determining a set of properties associated with the one or more device instances, wherein the set of properties comprises a device type associated with the one or more device instances;

generating an object hierarchy of the one or more device instances based on the determined set of properties, wherein the object hierarchy comprises the one or more device instances in the first data format and the set of properties associated with the one or more device instances; and identifying the device type associated with the one or more device instances of the one or more engineering objects based on the generated object hierarchy.

4. The method of claim 1, wherein the determining of the one or more transformations further comprises:

retrieving the metadata file corresponding to the identified second data format from the database.

5. The method of claim 1, wherein the determining of the one or more transformations further comprises:

storing the generated transformation associated with the identified device type in the database when no transformations associated with the identified device type are determined present in the metadata file; or retrieving the one or more transformations associated with the identified device type when the one or more transformations associated with the identified device type are determined present in the metadata file.

6. The method of claim 1, wherein the one or more transformations comprises: adding a specific device type to an object hierarchy, removing a specific device type from the object hierarchy, combining multiple devices into one single device, splitting one device into several devices, inserting specific properties, modifying specific properties for a specific device type, or a combination thereof.

7. An apparatus for processing engineering objects in an industrial automation environment, the apparatus comprising:

a processor; and a memory coupled to the processor, wherein the memory comprises an object transformation module stored in a form of machine-readable instructions executable by the processor, wherein the object transformation module is configured to:

obtain a first data file from a user device, wherein the first data file comprises one or more engineering objects in a first data format;

identify a device type associated with the one or more engineering objects in the first data file;

identify a second data format based on the obtained first data file;

determine one or more transformations associated with the identified device type associated with the one or more engineering objects based on a metadata file stored in a database, wherein the metadata file corresponds to the identified second format, wherein the metadata file comprises the one or more transformations associated with one or more device types of one or more device instances, and wherein the determining of the one or more transformations comprises determining whether the one or more transformations associated with the identified device type are present in the metadata file and generating at least one transformation associated with the identified device type based on a set of rules when no transformations associated with the identified device type are determined present in the metadata file;

transform the identified device type associated with the one or more engineering objects to the second data format based on the determined one or more transformations; and generate a second data file comprising the transformed device type, associated with the one or more engineering objects, in the second data format on a graphical user interface.

8. The apparatus of claim 7, wherein the second data file comprises a transformed object hierarchy for the transformed device type in the second data format.

9. The apparatus of claim 7, wherein, in the identifying of the device type associated with the one or more engineering objects in the first data file, the object transformation module is configured to:

generate the one or more device instances in the first data format for the one or more engineering objects based on the obtained first data file;

determine a set of properties associated with the one or more device instances, wherein the set of properties comprises a device type associated with the one or more device instances;

generate an object hierarchy of the one or more device instances based on the determined set of properties, wherein the object hierarchy comprises the one or more device instances in the first format and the set of properties associated with the one or more device instances; and identify the device type associated with the one or more device instances of the one or more engineering objects based on the generated object hierarchy.

10. The apparatus of claim 7, wherein, in the determining of the one or more transformations associated with the identified device type based on the metadata file stored in the database, the object transformation module is further configured to:

retrieve the metadata file corresponding to the identified second data format from the database.

11. The apparatus of claim 7, wherein, in the determining of the one or more transformations associated with the identified device type from the metadata file corresponding to the identified second data format, the object transformation module is further configured to:

and store the generated transformation associated with the identified device type in the database when no transformations associated with the identified device type are determined present in the metadata file; or retrieve the one or more transformations associated with the identified device type when the one or more transformations associated with the identified device type are determined present in the metadata file.

12. The apparatus of claim 7, wherein the one or more transformations comprises adding a specific device type to an object hierarchy, removing a specific device type from the object hierarchy, combining multiple devices into one single device, splitting one device into several devices, inserting specific properties, modifying specific properties for a specific device type, or a combination thereof.

13. A non-transitory computer implemented storage medium, having machine-readable instructions stored therein, that when executed by at least one processor, cause the processor to:
- obtain a first data file from a user device, wherein the first data file comprises one or more engineering objects in a first data format;
- identify a device type associated with the one or more engineering objects in the first data file;
- identify a second data format based on the obtained first data file;
- determine one or more transformations associated with the identified device type associated with the one or more engineering objects based on a metadata file stored in a database, wherein the metadata file corresponds to the identified second format, wherein the metadata file comprises the one or more transformations associated with one or more device types of one or more device instances, and wherein the determining of the one or more transformations comprises determining whether the one or more transformations associated with the identified device type are present in the metadata file and generating at least one transformation associated with the identified device type based on a set of rules when no transformations associated with the identified device type are determined present in the metadata file;
- transform the identified device type associated with the one or more engineering objects to the second data format based on the determined one or more transformations; and
- generate a second data file comprising the transformed device type, associated with the one or more engineering objects, in the second data format on a graphical user interface.

14. The storage medium of claim 13, wherein, in the identifying of the device type associated with the one or more engineering objects in the first data file, the machine-readable instructions cause the processor to:
- generate the one or more device instances in the first data format for the one or more engineering objects based on the obtained first data file;
- determine a set of properties associated with the one or more device instances, wherein the set of properties comprises a device type associated with the one or more device instances;
- generate an object hierarchy of the one or more device instances based on the determined set of properties, wherein the object hierarchy comprises the one or more device instances in the first data format and the set of properties associated with the one or more device instances; and
- identify the device type associated with the one or more device instances of the one or more engineering objects based on the generated object hierarchy.

15. The storage medium of claim 13, wherein, in determining the one or more transformations associated with the identified device type based on the metadata file stored in the database, the machine-readable instructions further cause the processor to:
- retrieve the metadata file corresponding to the identified second data format from the database.

16. The storage medium of claim 13, wherein, in determining the one or more transformations from the metadata file corresponding to the identified second data format, the machine-readable instructions further cause the processor to:
- store the generated transformation associated with the identified device type in the database when no transformations associated with the identified device type are determined present in the metadata file; or
- retrieve the one or more transformations associated with the identified device type if the one or more transformations associated with the identified device type are determined present in the metadata file.

17. The storage medium of claim 13, wherein the one or more transformations comprises adding a specific device type to an object hierarchy, removing a specific device type from the object hierarchy, combining multiple devices into one single device, splitting one device into several devices, inserting specific properties, modifying specific properties for a specific device type, or a combination thereof.

\* \* \* \* \*

UNITED STATES PATENT AND TRADEMARK OFFICE
CERTIFICATE OF CORRECTION

PATENT NO. : 11,188,498 B2  Page 1 of 1
APPLICATION NO. : 16/110744
DATED : November 30, 2021
INVENTOR(S) : Prashanth Uppunda It is certified that error appears in the above-identified patent and that said Letters Patent is hereby corrected as shown below:

In the Claims

Column 18, Line 60:
"and store the generated transformation associated with the"
Should be replaced with:
"store the generated transformation associated with the"

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*